Patented Apr. 24, 1934

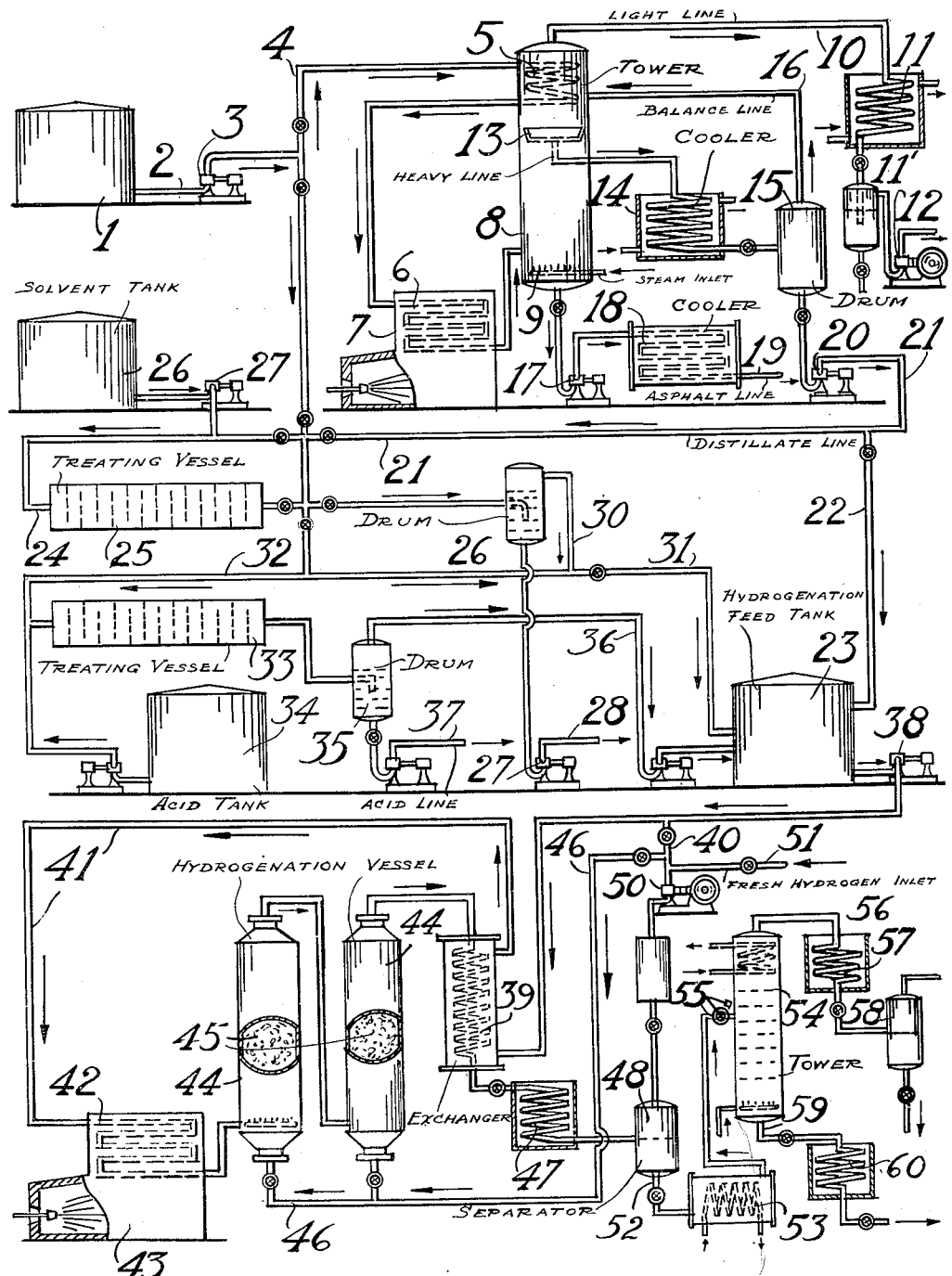

1,955,861

UNITED STATES PATENT OFFICE 1,955,861

PROCESS FOR PRODUCING LUBRICANTS

Robert P. Russell and Garland H. B. Davis, Baton Rouge, La., assignors to Standard-I. G. Company Application May 17, 1929, Serial No. 363,984
4 Claims. (Cl. 196—78)

The present invention relates to the art of producing superior grades of lubricating oil from crude oil and the heavier fractions therefrom heretofore considered undesirable for such purposes. Our invention will be fully understood from the following description.

In the drawing is shown in diagrammatic form a suitable apparatus for carrying out our invention.

It has been previously proposed to subject heavy hydrocarbon oil to treatment with free hydrogen under high pressure and at temperatures within the approximate range of 700 to 800° F. Catalysts for use in this process have also been suggested. We have found, however, that it is of great importance to produce a purified stock before such treatment and that after purification and subsequent hydrogen treatment, the recovered oil is much superior, not only as to color, carbon content, resistance to emulsification but also in respect to the change of viscosity with temperature.

In our process, any method by which heavy undistillable fractions either asphaltic or gummy, which are apparently highly unsaturated impurities, as indicated by high bromine values and which in some instances contain oxygen, are removed is satisfactory. For example, the oil may be treated with sulfuric acid in such concentration and amount that the asphalt or other impurity is substantially removed. Solvents such as liquid sulphur dioxid, aqueous phenol, amyl alcohol or other alcohols, aldehydes and ketones, or the like, or mixtures of these substances with each other or with naphtha may be used to precipitate the impurities and the solvent is then removed before hydrogenation treatment. The method which we prefer, however, is to vacuum distill the oil so as to avoid decomposition insofar as is possible and to separate the purified oil from less volatile asphaltic and other impurities. In some cases it may be desirable to combine two or more of these methods of purification such as, for example, vacuum distillation followed by a light sulphuric acid treatment or solvent extraction.

As stated above, the hydrogen treatment is preferably carried out under pressure in excess of about 100 atmospheres, and at a temperature of 700 to 800° F. at which decomposition is slow, and the time of exposure is relatively short so that not more than about 20% of light oil boiling below about 400° F. is produced. With light feed stocks, such as, for example, a light lubricating oil, the production of oil boiling below 400° F. will be relatively larger than is produced from a heavier feed stock, such as cylinder oil or the like. For example, with a heavy cylinder oil the production of light oil boiling below about 400° F. is below 15% and may be as low as 10 or even 5%. A hydrogenation catalyst is preferably used, such as molybdenum or chromium oxide or a mixture of such oxides with each other or with those oxides of the heavy polyvalent metals which are immune to sulfur poisoning. The hydrogen or gas rich in hydrogen should be in considerable excess of about 300 cu. ft. per barrel of feed oil.

As an illustrative example of our process, a vacuum distillate of the following characteristics is treated:

Gravity _____ 23.1° A. P. I.
Saybolt viscosity _____ 846 at 100° F.
Saybolt viscosity _____ 74 at 210° F.
Conradson carbon _____ 1.1%
Flash _____ 405° F.

The oil is passed through a reaction chamber containing a catalyst in countercurrent to a stream of hydrogen. The throughput is preferably maintained between 0.5 and 2.5 volumes of oil per volume of catalyst per hour. The temperature of the reaction chamber is between about 750 and 800° F. and the pressure is about 3000 pounds per square inch. About 10% of the oil is carried over head with the hydrogen. The remaining residual oil is reduced to about 50% bottoms which has the following characteristics:

Gravity _____ 26.2° A. P. I.
Saybolt viscosity _____ 713 sec. at 100° F.
Saybolt viscosity _____ 75 sec. at 210° F.
Conradson carbon _____ 0.35%
Flash _____ 465° F.

It will be noted that for a given viscosity at 210° F., the viscosity of the product at 100° F. is much less; the gravity and flash point are higher and the Conradson carbon lower. The distillate from the residual oil may be used as a spindle oil or the like. It is also found to be an excellent cracking oil.

Any suitable type of apparatus may be used in the practice of our invention but it is preferable to conduct the hydrogenation step according to the method of J. M. Jennings and disclosed in his application, Serial No. 385,762.

Referring to the drawing, the reference numeral 1 indicates a storage tank from which a crude or reduced crude oil is withdrawn through pipe 2 by a pump 3. The oil is forced through a line 4, a preheating coil 5, and through a fired coil 6 arranged in furnace setting 7. The heated oil then discharges into distillation tower 8, in which the preheating coil 5 may be arranged at the upper end in order to produce a suitable reflux. Steam to assist distillation may be added by the line 9. Light distillate representing kerosene, gas oil or light lubricating fractions are withdrawn by the line 10 to the condenser 11 drum 11' and vacuum is maintained by pipe 12. Heavier fractions recovered as a reflux are collected in a pan 13 and withdrawn through a cooler 14 to a separating drum 15. A balance line 16 is provided to equalize pressure in the drum 15 and in the tower 8. The heavy asphaltic residue may be withdrawn from the lower portion of the tower 8 by a pump 17, passed through a cooler 18 and thence to storage by the line 19. The lubricating distillate is removed from receiving drum 15 by a pump 20 and is forced through a line 21 and a branch line 22 into a feed tank 23, from which it may be removed for subsequent hydrogenation. If desired, oil from the line 21 may be passed by a pipe 24 into a treating vessel 25. A selective solvent of the type mentioned above may be withdrawn from a storage vessel 26 and forced by a pump 27 into the line 24 so as to mix with the oil in the treating vessel 25. The treating vessel may be of any particular type and, as will be understood. Several separate stages of treatment may be provided if desired, only one of which is shown for purposes of illustration. The mixture of the oil and solvent passes into a separation drum 26. The treating agent containing extracted materials is withdrawn by a pump 27 and line 28, and the treating agent may be recovered in any suitable manner not shown, and the recovered solvent may be returned again to the storage tank 26. Extracted oil is removed from the separation drum 26 by a line 30 and may be run directly into the hydrogenation feed tank 23 mentioned above. If desired, the oil may be given a further treatment instead of being run directly to tank 23 and may be passed by a line 32 to a second treating vessel 33. Sulphuric acid may be withdrawn from a storage tank 34 and passed into the line 32 so as to admix and react with the oil in the treating vessel 33. As before, the treating vessel may be a simple baffled drum, as shown in the drawing, or it may be countercurrent or arranged in several steps, as is well known in the art. The sulphuric acid is removed from the oil in the separation drum 35 and the purified oil may be washed with water and caustic soda, not shown in the drawing, and forwarded by line 36 to the hydrogenation feed vessel 23. The spent acid is removed by a line 37 from the separation drum 35 and may be rendered for re-use by well known means.

From the above description it will be seen that the original oil may be subjected first to vacuum distillation and then to a process of solvent extraction and sulphuric acid treatment. Suitable lines and valves are provided, however, so that the vacuum distillation step may be used alone or in combination with either the solvent extraction or sulphuric acid treatment. Similarly, the oil may be subjected without vacuum distillation, either to solvent extraction or sulphuric acid treatment or to a combination process in which both steps are utilized.

Oil from the hydrogenation feed tank 23 is withdrawn by a pump 38 and forced through an exchanger 39 along with hydrogen, which is introduced by a pipe 40. After preheating, the mixture of oil and hydrogen passes through a line 41 to a heating coil 42 arranged in the furnace 43. The oil and hydrogen now pass through the destructive hydrogenation vessels 44. It will be understood that a single vessel can be used or several vessels may be connected either in series or in parallel. The catalyst which has been described above is packed into the reaction vessels and is indicated at 45. Additional hydrogen may be added to one or both of the reaction vessels by a pipe 46. The treated oil and hydrogen pass from the reaction vessels through the heat exchanger 39 and into a cooler 47 before discharge into a separation vessel 48. Gaseous hydrocarbons and hydrogen are removed under high pressure and are subjected to purification at 49. This treatment may be of any suitable type capable of removing sulphur compounds and hydrocarbons, such as methane. The purified hydrogen is recompressed by booster pump 50 and returned to the line 40. Fresh hydrogen may be introduced at 51. The condensed oil is removed from the separation drum 48 by a pipe 52, reheated at 53 and passed into a distillation tower 54 with reduction of pressure at the valve 55. Light oil such as gasoline, kerosene, and gas oil is removed by a pipe 56 in the form of vapor, is condensed in the cooler 57 and collected in the tank 58. The improved lubricating fractions are removed from the distillation tower at 59 and are cooled in the pipe coil 60 from which they can be removed to storage.

Our invention is not to be limited by any theory of the mechanism of the process nor by any example given merely for purposes of illustration, but only by the following claims in which we wish to claim all novelty inherent in our invention.

We claim:

1. In a process of destructive hydrogenation for producing high grade lubricating oils from heavy petroleum residual oils of a class containing asphaltic and resinous bodies of the general type removable by vacuum distillation, solvent extraction and sulphuric acid treatment, in which such oil is passed in liquid phase together with hydrogen through a reaction zone packed with lumps of a catalyst immune to sulphur poisoning, while maintained at a temperature between the approximate limits of 700 and 800° F. while under pressure in excess of 100 atmospheres and at such a rate as to permit a substantial formation of naphtha, but less than 20% of the feed, the improvement which comprises the initial stop of removing from said oil substantially all of the said resinous and asphaltic bodies, under conditions adapted to avoid any substantial decomposition of the oil.

2. Process according to claim 1, in which the initial step of removing the asphaltic and resinous bodies is accomplished by vacuum distillation.

3. Process according to claim 1, in which the initial step of removing the asphaltic and resinous bodies is accomplished by extraction with solvents of the type capable of precipitating such impurities from the oil and in which the solvent is removed from the oil prior to destructive hydrogenation.

4. Process according to claim 1, in which the initial step of removing the asphaltic and resinous bodies is accomplished by sulphuric acid treatment.

ROBERT P. RUSSELL.
GARLAND H. B. DAVIS.